Aug. 23, 1927.
D. W. BERLIN
1,639,681
SELF LOCKING NUT
Filed Dec. 17, 1925
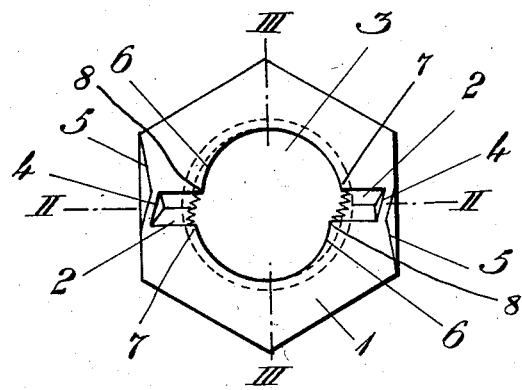
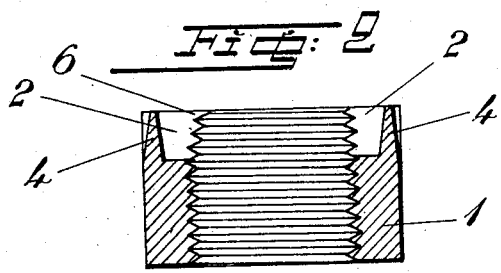
Inventor
David Werner Berlin
By Pennie, Davis, Marvin & Edmonds
Attorneys Patented Aug. 23, 1927.

1,639,681

UNITED STATES PATENT OFFICE.

DAVID WERNER BERLIN, OF RASUNDA, SWEDEN.

SELF-LOCKING NUT.

Application filed December 17, 1925, Serial No. 75,998, and in Sweden September 11, 1925.

This invention relates to a self-locking nut of the type in which a part of the nut itself brings about the locking. Lock-nuts and nut locks hitherto constructed and brought out on the market are all marred by the defect of being too complicated and expensive to manufacture, and for those reasons are not as widely used as is desirable. This invention relates to a self-locking nut of such a simple construction that it can be manufactured en masse with ordinary nut-making machines thus making it scarcely more expensive than an ordinary nut.

The invention is made plain in the annexed drawing, where an example of it is shown. Fig. 1 is a nut viewed from above, Fig. 2 a section along the line II—II (Fig. 1), and Fig. 3 a section along the line III—III (Fig. 1).

The upper part of the nut body 1, in accordance with the invention, is on one or more side portions, in relation to the central boring or aperture 3, provided with grooves or notches 2 extending either radially or at an angle with the radii from the bolt-hole 3, and lying in the plane of the top or at an angle to said plane. These grooves are cut to a certain depth and open upon the aperture 3 but terminate at some distance from the outer edge of the nut so that the said edge remains intact and an end wall 4 limits the notch on the exterior side. Further the upper part of the wall or walls of the nut at the one side of the notch or notches (i. e. the side in the direction of the turning of the nut when being screwed on a bolt) is radially pressed in at 5, whilst the opposite side part 7 (or parts) is intact, so that the distance from the windings 6 at the impressed part to the approximately diametrically opposite windings or nut part is reduced and, as shown in Fig. 1, excentric windings are formed in the upper part of the nut, which windings from the part of the nut corresponding to the bottom part of the notches up towards the top part of the nut are more and more dislocated in relation to the windings at the part of the nut opposite to the said pressed-in part, as is shown in Fig. 2. The grooves or notches are preferably of a wedge-shaped or similar cross-section (see Fig. 3) so that they can be made by pressing. The end wall 4 formed by the outer part of the nut in the grooves conduces to increase considerably the elastic or resilient force in the pressed-in parts of the upper part of the nut body, whereby the locking power is considerably increased. Moreover the appearance of the nut is more attractive owing to the fact that the outer part of the top of the nut is unbroken.

Having thus described my invention I declare that what I claim is:—

1. A lock nut comprising a nut body provided with a central, screw-threaded bolt hole formed therein, a groove formed in the top portion of the nut-body and extending from said bolt hole towards the outer edge of the nut and ending at a sufficient distance from said edge so that an end wall for said groove is there formed, the material of said upper part of the nut at the one side of said groove being inwardly pressed in the same direction as the groove against the bolt-hole so that the corresponding inner screw-threaded top part of the bolt-hole has an eccentric cross-section in the plane of said groove.

2. A lock nut comprising a nut-body provided with a central screw threaded bolt-hole formed therein, grooves formed in the top portion of the nut-body and extending from said bolt-hole towards the outer edge of the nut and ending at a sufficient distance from said edge so that end walls for said grooves are there formed, the material of said upper part of the nut at the one side of said grooves being inwardly pressed in the same direction as the grooves from outside inwards against the bolt-hole so that the corresponding inner screw threaded top part of the bolt-hole has an eccentric cross-section in the plane of said grooves.

3. A lock-nut comprising a nut-body provided with a central screw threaded bolt-hole formed therein, grooves formed in the top portion of the nut body and extending from said bolt-hole towards the outer edge of the nut and ending at a sufficient distance from said edge so that end walls for said grooves are there formed, the material of said upper part of the nut at the one side of said grooves being inwardly pressed in the same direction as the grooves from outside inwards against the bolt-hole so that the corresponding inner screw threaded top part of the bolt-hole has an eccentric cross-section in the plane of said grooves, said eccentric portions of the cross-section formed by said pressed-in portions lying at that side of said grooves which is the forward side when the nut is being screwed into its effective position.

4. A lock-nut comprising a nut-body provided with a central screw threaded bolt-hole formed therein, grooves formed in the top portion of the nut-body and extending from said bolt-hole towards the outer edge of the nut and ending at a sufficient distance from said edge so that end walls for said grooves are there formed, the material of said upper part of the nut at the one side of said grooves being inwardly pressed in the same direction as the grooves from outside inwards against the bolt-hole said grooves being of wedge shape in vertical cross section.

5. A lock-nut comprising a nut-body provided with a central screw threaded bolt-hole formed therein, grooves formed in the top portion of the nut-body and extending from said bolt-hole towards the outer edge of the nut and ending at a sufficient distance from said edge so that end walls for said grooves are there formed, the material of said upper part of the nut at the one side of said grooves being inwardly pressed in the same direction as the grooves from outside inwards against the bolt-hole so that the corresponding inner screw threaded top part of the bolt-hole has an eccentric cross-section in the plane of said grooves, and the inner side of the screw-threaded bolt-hole formed by the pressed-in part of the nut-body being increasingly contracted upwardly from the bottom of said groove, while the opposite sides of the bolt-hole is intact so that the eccentricity of the screw threads increases gradually upwards.

6. A lock-nut, comprising a nut-body provided with a central screw thread bolt-hole formed therein, two wedge-shaped grooves formed in opposite sides of the top portion of the nut-body and extending from said bolt-hole horizontally towards the outer edge of said nut-body and ending at a sufficient distance from said edges so that an end wall for said wedge-shaped grooves is there formed, the material of said upper part of the nut at one side of said wedge-shaped grooves being inwardly pressed in a radial direction from one of the faces of the nut-body inwards against the bolt-hole so that the corresponding inner screw-thread top part of the bolt-hole has an eccentric cross-section in the plane of said wedge-shaped grooves.

In witness whereof I have hereunto set my hand.

DAVID WERNER BERLIN.